A. SCHMID & J. C. BECKFELD.

GAS ENGINE.

No. 10,878. Reissued Nov. 1, 1887.

Fig. I.

WITNESSES:

M. S. Murphy.

P. E. Gaither.

INVENTOR,

Albert Schmid
J. Charles Beckfeld
by Darwin S. Wolcott Att'y.

6 Sheets—Sheet 2.

A. SCHMID & J. C. BECKFELD.

GAS ENGINE.

No. 10,878. Reissued Nov. 1, 1887.

WITNESSES:

M. S. Murphy.

P. E. Gaither.

INVENTOR,

Albert Schmid

J. Charles Beckfeld by Darwin S. Wolcott Att'y.

A. SCHMID & J. C. BECKFELD.

GAS ENGINE.

No. 10,878. Reissued Nov. 1, 1887.

WITNESSES:

M. S. Murphy.

P. E. Gaither.

INVENTOR,

Albert Schmid

J. Charles Beckfeld by Damm & Wolcott Att'y.

A. SCHMID & J. C. BECKFELD.

GAS ENGINE.

No. 10,878. Reissued Nov. 1, 1887.

WITNESSES:

W. S. Murphy.

P. E. Gaither.

INVENTOR,

Albert Schmid

J. Charles Beckfeld by Darwin S. Wolcott Att'y.

A. SCHMID & J. C. BECKFELD.

GAS ENGINE.

No. 10,878. Reissued Nov. 1, 1887.

WITNESSES:

M. S. Murphy.

F. E. Gaither.

INVENTOR,

Albert Schmid,
J. Charles Beckfeld
by Darwin S. Wolcott Att'y.

A. SCHMID & J. C. BECKFELD.

GAS ENGINE.

No. 10,878. Reissued Nov. 1, 1887.

WITNESSES:

M. S. Murphy.

P. E. Gaither.

INVENTOR,

Albert Schmid

J. Charles Beckfeld by Darwin S. Wolcott Att'y.

UNITED STATES PATENT OFFICE.

ALBERT SCHMID, OF ALLEGHENY, AND J. CHARLES BECKFELD, OF RESERVE, PENNSYLVANIA.

GAS-ENGINE.

SPECIFICATION forming part of Reissued Letters Patent No. 10,878, dated November 1, 1887.

Original No. 362,187, dated May 3, 1887. Application for reissue filed June 1, 1887. Serial No. 239,991.

*To all whom it may concern:*

Be it known that we, ALBERT SCHMID, a citizen of the Republic of Switzerland, residing at Allegheny, and J. CHARLES BECKFELD, a citizen of the United States, residing in Reserve township, in the county of Allegheny and State of Pennsylvania, have invented or discovered certain new and useful Improvements in Gas-Engines, of which improvements the following is a specification.

Figure 1:
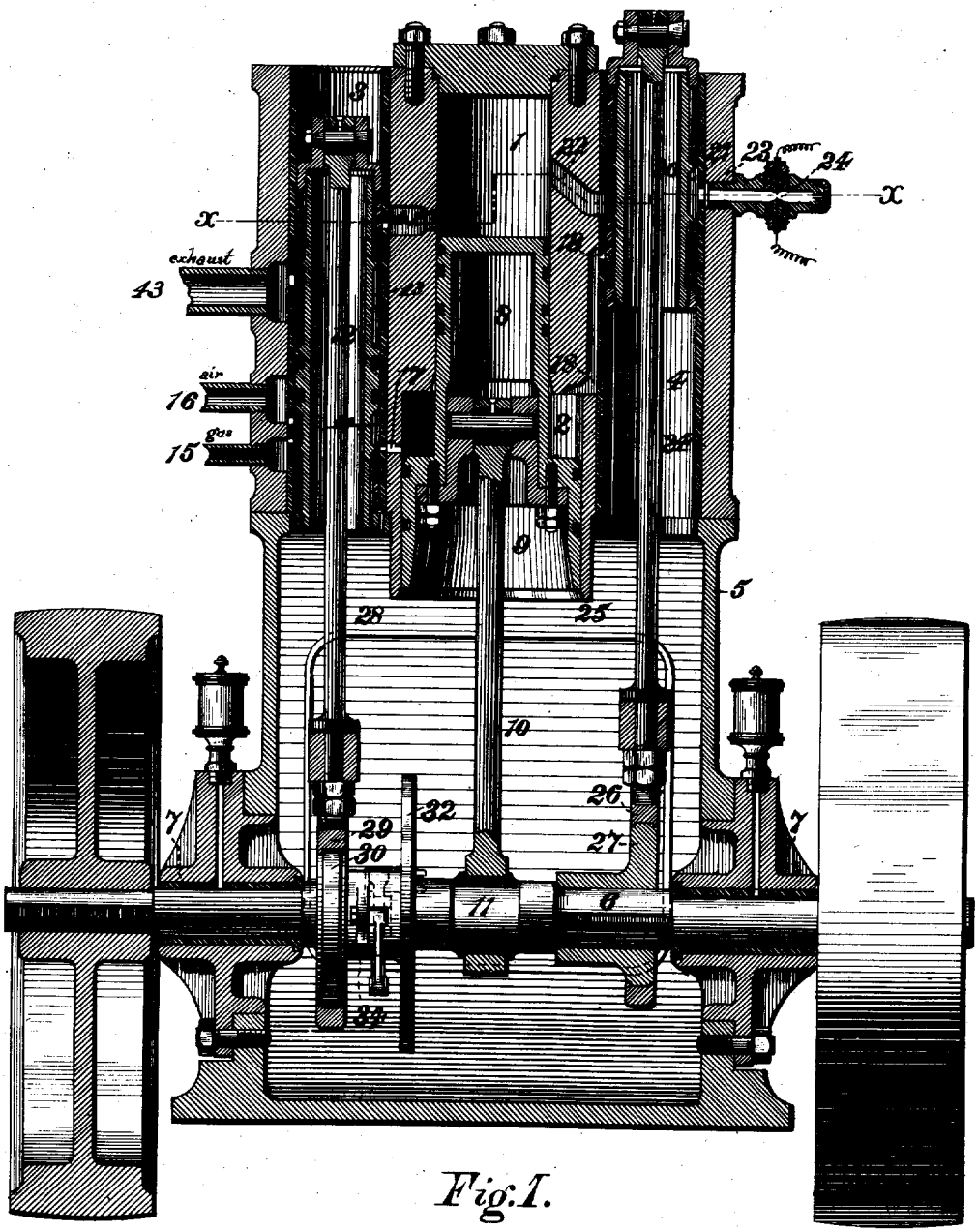
Figure 2:
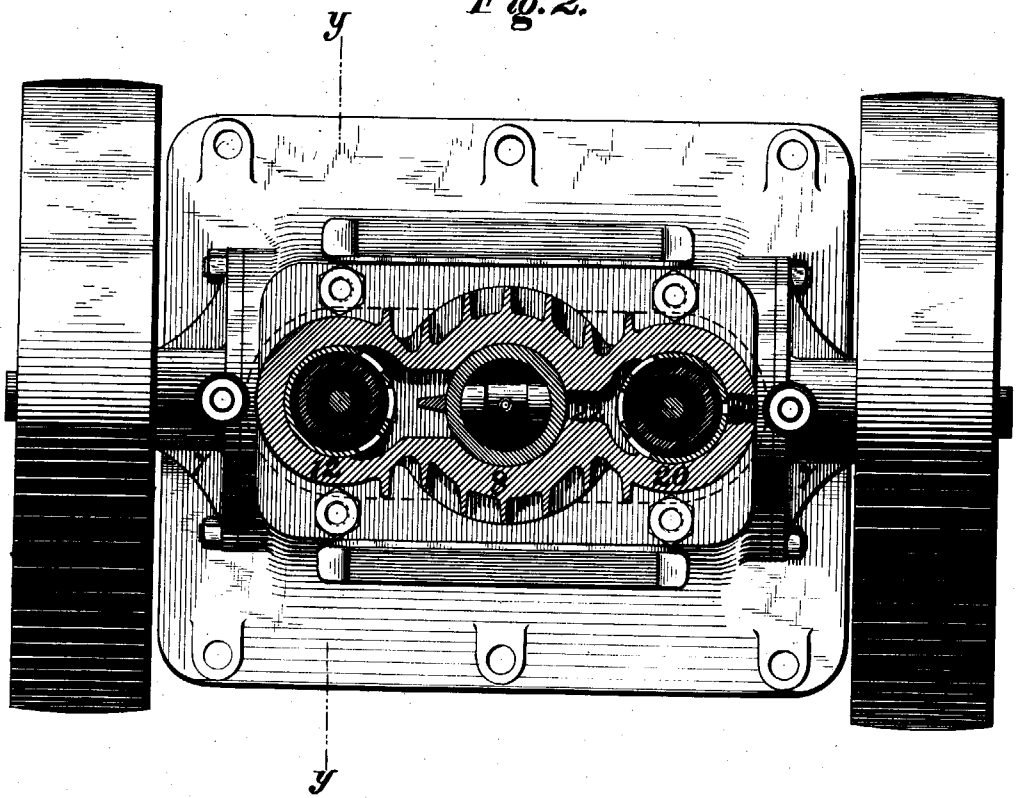
Figure 14:
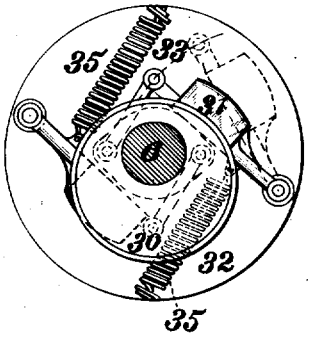
Figure 15:
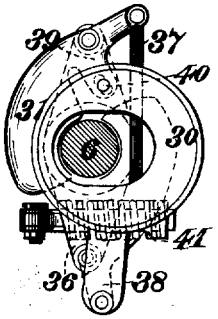
Figure 3:
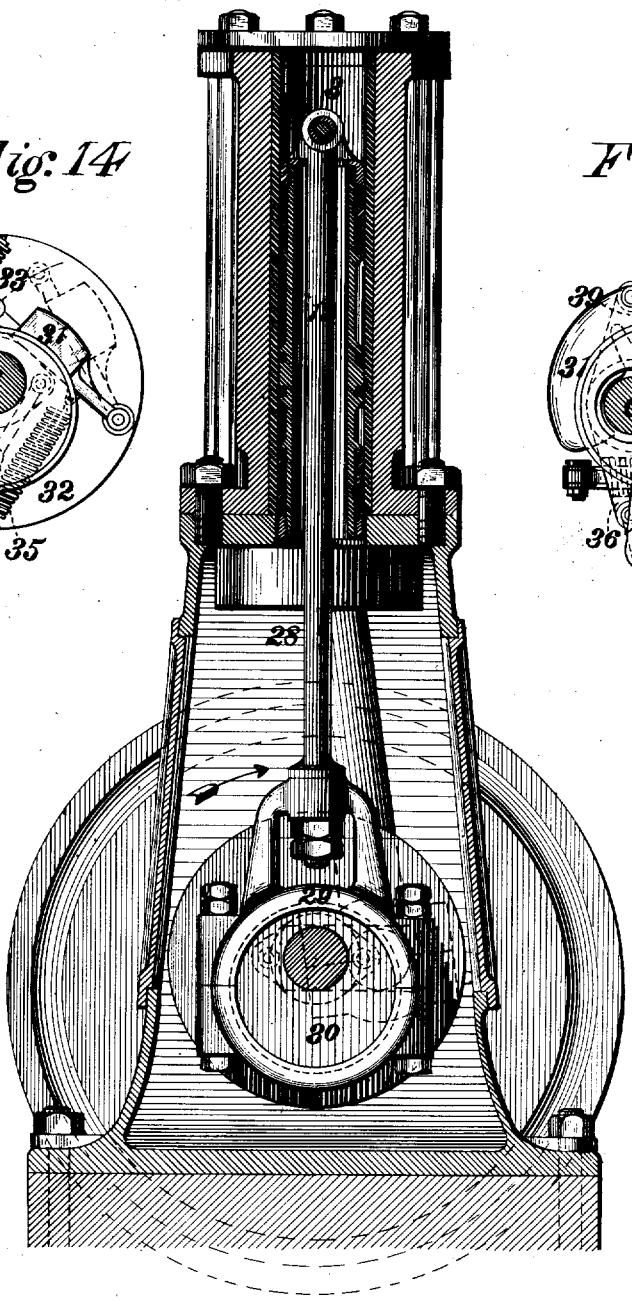
Figure 4:
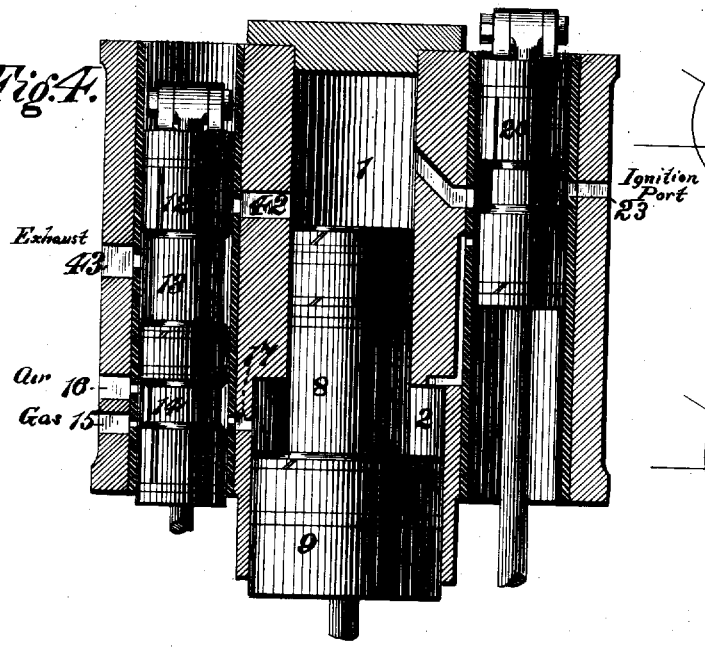
Figure 6:
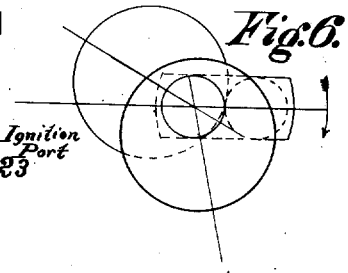
Figure 7:
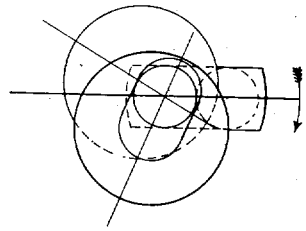
Figure 5:
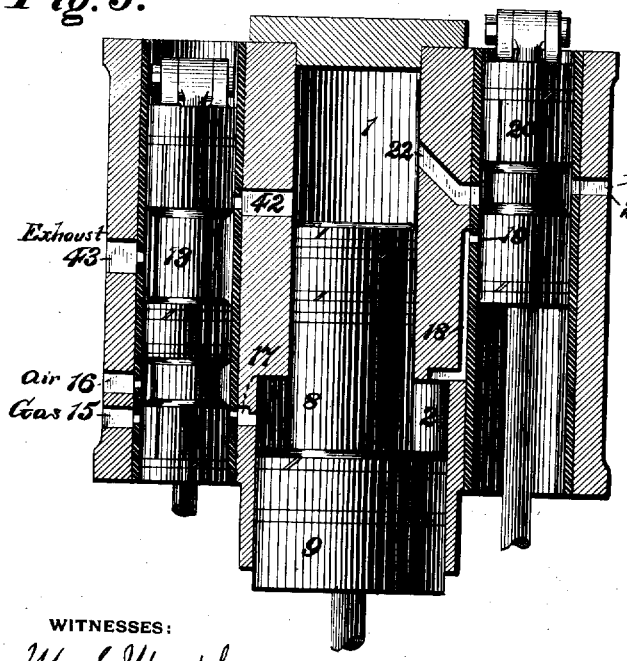
Figure 8:
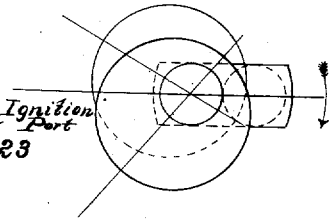
Figure 9:
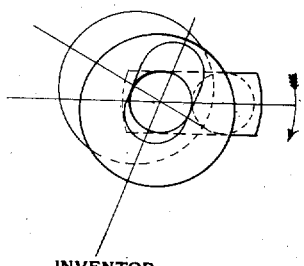
Figure 10:
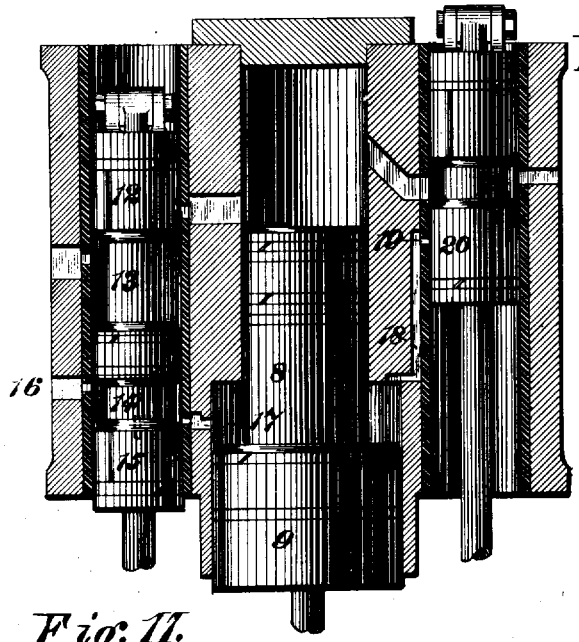
Figure 12:
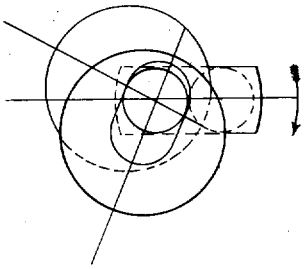
Figure 11:
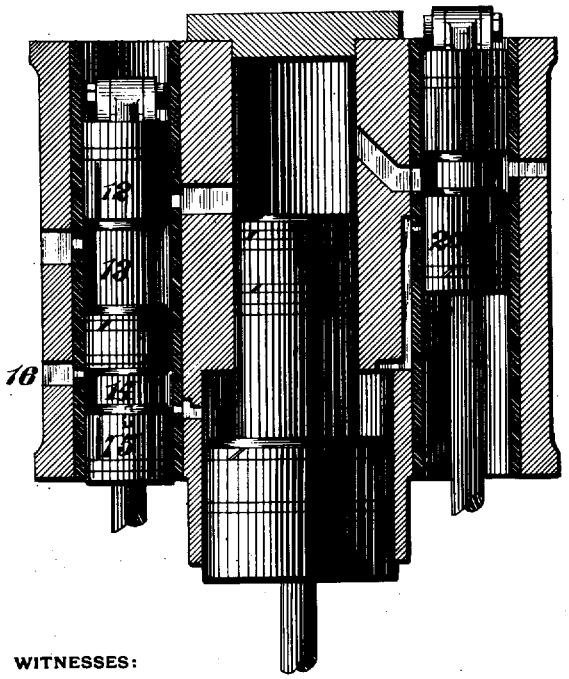
Figure 13:
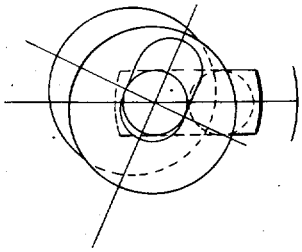
Figure 16:
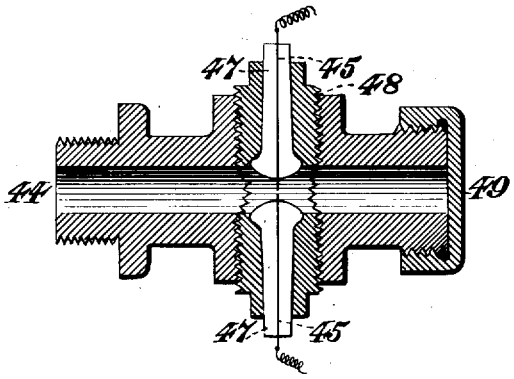
Figure 17:
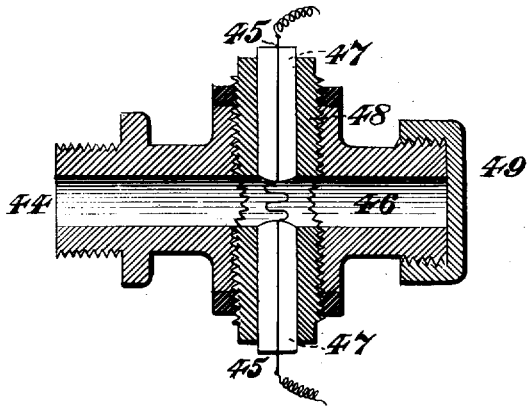

In the accompanying drawings, which make part of this specification, Figure 1 is a sectional elevation of a single-acting gas-engine embodying our improvements. Fig. 2 is a transverse section of the same on the line *x x*, Fig. 1. Fig. 3 is a sectional elevation, the section being taken on the line *y y*, Fig. 2. Figs. 4 and 5 are sectional detail views of the main cylinders and valve-chambers, showing the different positions of the valve as regulated by the adjustable eccentric. Figs. 6, 7, 8, and 9 are diagrammatic views illustrating the adjustment of the eccentric, Figs. 6 and 8 showing an eccentric adjustable around the shaft, and Figs. 7 and 9 showing an eccentric adjusted transversely of the shaft. Figs. 10 and 11 are views similar to Figs. 4 and 5, showing the manner of regulating the richness of the explosive. Figs. 12 and 13 are diagrammatic views showing the adjustment of the eccentric for regulating the valve in Figs. 10 and 13. Figs. 14 and 15 are views of two forms of the governor and eccentric. Figs. 16 and 17 are sectional views of two constructions or forms of ignitors.

The invention herein relates to certain improvements in gas-engines in which the motive power—*i. e.*, explosions of gas and air—occurs at each forward stroke of the piston, the power or force of the explosion being regulated by the amount of explosive mixture admitted to the explosion-chamber and by limiting or cutting off the exhaust.

The invention consists in uniting the power and compression cylinders and pistons in integral structures in line with each other, in regulating the admission of the explosive mixture to the compression-cylinder and thence to the explosion-chamber by alternately-operating valves, and regulating the flow of the explosive mixture to the explosion-chamber and the exhaust from the said chamber by and in accordance with the speed of the engine.

The shell, in which are formed the cylinders 1 and 2 and the valve-chambers 3 and 4, is secured to the top of the crank-case 5. The crank-case serves as a bed or support for the engine, and also for a receptacle for the reception of lubricating material for the crank-pin, eccentrics, and journals of the crank-shaft 6, the bearings 7 for said journals being formed at the ends of the case. The cylinders 1 and 2, the former being the power-cylinder and the latter the compression-cylinder, are open at their lower ends, the power-cylinder opening at its lower end into the compression-cylinder, which is formed of a greater diameter than the cylinder 1. The pistons 8 and 9 for the cylinders are formed integral with each other, as shown, and are coupled by a connecting-rod, 10, with the crank-pin 11 on the crank-shaft 6.

The valve-chamber 3 is provided with a valve, 12, provided with ports or passages 13 and 14, for governing the exhaust from the power-cylinder and the admission of gas and air to the compression-cylinder 2. The gas and air are admitted to the valve-case 3 through ports 15 and 16, which are of such a relative size as to admit the proper proportions of gas and air to form the explosive mixture which escapes from the valve-case into the compression-cylinder 2 through the port 17. The explosive mixture is conducted from the cylinder 2 into the valve-case 4 by a passage, 18, and port 19, said valve-case being provided with a valve, 20, having the chamber or port 21, by which, at a certain position of valve, the mixture is conducted to the upper end of the cylinder 1 through the port 22. The port 21 also serves to connect the port 22, leading to the cylinder 1, and the port 23, leading to the ignitor 24. The cylinder 1 is made considerably longer than the stroke of the piston 8, thereby forming a chamber at the upper end of said cylinder when the piston is at the upper limit of its stroke in which the explosions of the combined gas and air occur. The gases escape from the cylinder 1 through the port 42 into the chamber or port 13 in the valve 12, and from thence through the port 43 into the open air. The valves 12 and 20 are preferably of that class or kind known as "piston-valves."

The valve 20 is connected by a rod, 25, to the strap 26, surrounding the eccentric 27, secured to the crank-shaft, and the valve 12 is coupled by a rod, 28, to the strap 29, surrounding the eccentric 30, adjustably mounted on the crank-shaft. In Fig. 14 weights 31 are pivoted to a disk, 32, secured to the shaft 6, the free ends of said weights being connected by links 33 to a hollow hub, 34, (see Fig. 1,) projecting from the side of the eccentric. These weights, under the action of centrifugal force, move outward away from the shaft, and thereby cause the eccentric to rotate around the shaft and thus change the time of cut-off of the valve 12. The eccentric is restored to its normal position by the centripetal action of the coiled springs 35, which are attached at their ends to the weights 31 and the disk 32. An equivalent adjustment of the valve 12 can be affected by the construction shown in Fig. 15, illustrating another form of shaft-governor.

In the construction shown in Fig. 15 the eccentric 30 is provided with a slot or elongated opening, through which passes the crank-shaft 6, and on the shaft 6 is secured a frame, 36, to the ends of which are pivoted the weights 31. These weights are connected together on opposite sides of their pivotal points by rod 37, thereby insuring simultaneous and equal movements of the weights. To the eccentric is attached an arm, 38, said arm being pivotally connected to a lug formed on one of the weights 31. On the other weight is formed a lug or ear, 39, provided with a slot, with which a pin, 40, on the eccentric 30 engages, said pin being opposite the arm 38, above referred to.

As the weights are moved outwardly under the action of centrifugal force the eccentric 30, through the medium of its connections with the weights, as above stated, is so moved transversely of the shaft 6 as to bring its center nearer to the center of rotation—*i. e.*, the center of the shaft 6. The weights as the speed decreases are drawn inwardly by the action of the spring 41, the inward movement of the weights 31 imparting such a movement to the eccentric 30 as to move its center away from the center of the shaft 6. An ignitor, consisting of a tube, 44, into which project wires 45, said wires either having their inner ends in close proximity to each other, as shown in Fig. 16, or else united by a spiral, 46, of thin wire, as shown in Fig. 17, is screwed into the shell of the valve-chamber 4 in line with the port 23. The wires 45 are surrounded by cylinders or cores 47, of insulating material, inclosed within metal plugs 48, screwing into the tube 44 on diametrically-opposite sides. The outer end of the tube 44 is closed by a cap, 49, which can be removed for the purpose of cleaning the tube 44.

In operating our improved engine the gas and air enter through ports 15 and 16 into the chamber 14 in the valve 12. While the engine is running at normal speed the eccentric 30 is so set as to uncover the ports 17 during the downward stroke of the pistons 8 and 9, just before said port is uncovered at its opposite end by the piston 9. As soon as the port 17 is uncovered the combined gas and air will flow therethrough from the valve chamber or port 14 into the cylinder 2 above the piston 9. This flow of gas and air through the ports 15 and 16, valve port or chamber 14, and port 17 into the cylinder 2 will continue until the pistons 8 and 9 have nearly reached the lower limit of their stroke, by which time the valve 12 will be moving upward and will have closed the gas-port 15 and combined gas and air port 17, which, as shown in Figs. 1, 4, and 5, are in line with each other, and uncovered the exhaust-port 42, thereby permitting the exploded gases to escape from the cylinder 1 into the open air through the port 42, valve chamber or port 13, and exit-port 43. During the above movements of the pistons 8 and 9 and valve 12 the valve 20 is in such a position as to close the port 19; but as soon as the pistons 8 and 9 begin their upward movement the valve 20 is moved downward, so as to cover the port 23, leading to the ignitor, and subsequently to connect the ports 19 and 22 by its valve-port 21, thereby permitting the combined gas and air to flow from the cylinder 2 through said several ports into the cylinder 1 above the piston 8. As the pistons 8 and 9 approach the upward limit of their stroke the motion of the valve 20 is reversed, and just before said pistons 8 and 9 have completed their upward movement the valve 20 will close the port 19, and will immediately afterward, and just as the pistons 8 and 9 are about to begin their downward movement, uncover the port 23 and permit a portion of the gas and air to flow from the cylinder 1, through the port 22, valve-port 21, and port 23, into the ignitor 24, where the gas is ignited, and the flame will travel back through the ports just mentioned into the cylinder 1 and explode the combined gas and air therein. The movement of the valve 20 is so regulated that before it uncovers the port 19, thereby allowing the combined gas and air to enter the cylinder 1, the piston 8 will have reached such a point in its upward stroke as to close the exhaust-port 42, which is subsequently covered by the valve 12. As the pistons 8 and 9 move downward under the force of the explosion the valve 12 will have moved down far enough to uncover the gas-port 15 and the combined gas and air port 17, so as to permit the combined gas and air to flow into the cylinder 2 as soon as the port 17 is uncovered by the piston 9.

The above-described cycle of movements is continued as long as the speed of the engine remains normal. As soon, however, as the speed of the engine increases, the eccentric 30 will be so moved as to either change the point of movement of the valve 12, if the construction of governor shown in Fig. 14 be used, or else to change the amount of movement of said valve, if the form of governor shown in Fig. 15 be employed, by the outward movement of the weights 31 beyond the position at normal speed. In either case the results will be the same—*i. e.*, to limit the amount of combined gas and air admitted to the cylinder 2—that is to say, the travel of the valve 12 will be so changed as to uncover the ports 15 and 17 after the port 17 has been uncovered by the piston 9. As will be readily understood, these changes in the movement of the valve 12 will reduce the volume of combined gas and air which is admitted into the cylinder 2 and thence forced into the cylinder 1, and consequently the force of the explosion in the cylinder 1 is correspondingly reduced. In addition to the reduction of the volume of gas and air admitted to the cylinder 1 by the change or adjustment of the eccentric 30 above described, and consequent change in the movement of the valve 12, the amount of exhaust of the exploded gases from the cylinder 1 is correspondingly reduced, thereby causing a retention of a greater or less portion of the dead gases in the cylinder 1, and thereby deteriorating the explosive power of the limited amount of combined gas and air which has been admitted into said cylinder, as above described.

In Figs. 10 and 11 is shown a construction and arrangement of the gas and air inlet ports 15 and 16, by which, in connection with the form of governor shown in Fig. 15, a change in the quantity of gas admitted can be effected, thereby proportioning the richness of the explosive compound admitted into the cylinder 1 to the power required.

The gas-port 15, as shown in said Figs. 10 and 11, while having its upper edge in line with the upper edge of the port 17, is somewhat elongated downwardly, thereby permitting of a comparatively large flow of gas when the eccentric 30 is so adjusted as to permit of the greatest movement of the valve 12, but limiting that flow of gas as the movement of the valve 12 is limited by the lessening of the eccentricity of the eccentric 30 by the outward movement of the weights 31.

The arrangement of the gas-port 15 and the port 17 with their upper edges in, or approximately in, the same horizontal plane insures the simultaneous opening and closing of both ports by the valve 12, and hence no gas will escape through the air-port 16, which is constantly open, but will pass directly through the valve-chamber into the compression-cylinder. This relative arrangement of the ports not only prevents a loss of gas, but also any contamination of the outside air by the gas.

It will be noticed that the speed of the engine is affected not only by the limiting of the amount of combined gas and air admitted to the cylinder 1, but also by the diminution of the amount of gas admitted and consequent loss of explosive power in the combined gas and air.

In the form of ignitor shown in Fig. 16 we propose employing electricity generated either by some suitable form of Holtz electric generator, driven by or from the engine, or by other suitable means, whereby a constant stream of sparks will be produced between the adjacent ends of the electric wires 45 within the tube 44. In the form of ignitor shown in Fig. 17 the wire spiral 46 is maintained in a state of incandescence by a current of electricity from any suitable source of supply. It will be observed that in both forms of ignitor a constant stream of sparks, or a steady continuous incandescence, is maintained, thereby in either case preventing a deposition of soot or other substance formed by the burning of the gases upon the wires; and it will further be observed that in our form and construction of engine the period of explosions is regulated entirely by the movement of a valve which controls the admission of the gases into the explosion chamber or cylinder, and that the form and construction of said valve, as well as the valve 12, which governs the exhaust, is such as not to be readily liable to become clogged or fouled by the products of combustion of the gases, and that this form of valve is such as to be capable of being easily packed and balanced.

While we have referred to the valves 12 and 20 as though they were single valves, each, in reality, is a double valve, as will be readily understood.

It will be observed that the amount of exhaust from the power-cylinder is always in direct ratio to the amount of combined gas and air admitted into the compressing-cylinder—that is to say, the shorter the cut-off of combined gas and air to the compressing-cylinder the shorter will be the cut-off of the exhaust from the power-cylinder, thereby preserving a uniform pressure of charge in the power-cylinder before ignition.

We claim herein as our invention—

1. In a gas-engine, the combination of power and compressing cylinders, a valve-chamber connected thereto by suitable ports, and a valve located within said chamber and constructed and arranged to co-operate with the power-piston in controlling the flow of dead gases from the power-cylinder, substantially as set forth.

2. In a gas-engine, the combination of power and compressing cylinders, a valve-chamber connected thereto by suitable ports, and a valve located within said chamber and constructed and arranged to co-operate with the compression-piston in controlling the flow of gas and air into the compressing-cylinder, substantially as set forth.

3. In a gas-engine, the combination of the power and compressing cylinders, a valve-chamber connected thereto by suitable ports, a valve located within said chamber and constructed and arranged to co-operate with the pistons in regulating the flow of gas and air into the compressing-cylinder and of dead gas from the power-cylinder, and an adjustable eccentric on the power-shaft of the engine for regulating the movement of said valve in accordance with the speed of the engine, substantially as set forth.

4. In a gas-engine, the combination of the compressing-cylinder, a valve-chamber connected thereto by a port, 17, and provided with gas and air inlet ports 15 and 16, the ports 15 and 17 being located in such relation to each other and the travel of the valve that the gas may pass directly through the valve-chamber into the compressing-cylinder, and a valve constructed and arranged to open and close the ports 15 and 17, substantially as set forth.

5. In a gas engine, the combination of the compressing-cylinder, a valve-chamber connected thereto by a port, 17, and provided with gas and air inlet ports 15 and 16, the gas-port being elongated in the direction of the movement, a valve operating within said chamber to open and close the ports 15 and 17, and a governor for regulating the travel of the valve, thereby regulating the amount of gas admitted to the compressing-cylinder, substantially as set forth.

6. In a gas-engine, the combination of the power and compressing cylinders, a valve-chamber connected to said cylinders by suitable ports, and a piston-valve located within said chamber, and constructed and arranged, substantially as set forth, to co-operate with the pistons in controlling the flow of gas and air into the compressing-cylinder and the flow of dead gases from the power-cylinder, substantially as set forth.

7. In a gas-engine, the combination of the power and compressing cylinders, a valve-chamber connected to said cylinders by suitable ports, a piston-valve located within said chamber and constructed and arranged to regulate the flow of gas and air to the compressing-cylinder and escape of dead gases from the power-cylinder, and an adjustable eccentric on the power-shaft of the engine for regulating the movements of said piston-valve in accordance with the speed of said engine, substantially as set forth.

8. In a gas-engine, the combination of the compressing-cylinder, a valve-chamber connected thereto by a suitable port, 17, and provided with gas and air inlet ports 15 and 16, the gas-port being in line with the port connecting the valve-chamber and cylinder, and a piston-valve constructed and arranged to open and close the ports 15 and 17 simultaneously, substantially as set forth.

9. In a gas-engine, the combination of the power-cylinder, a valve-chamber connected thereto by a suitable port, 22, an ignitor consisting of a tube connected by a port, 23, to the valve-chamber, said ports 22 and 23 being in line with each other, or approximately so, a constant igniting flame or body located in the tube, and a piston-valve constructed and arranged to regulate communication between the cylinder and ignitor-tube, substantially as set forth.

In testimony whereof we have hereunto set our hands.

ALBERT SCHMID.
J. CHARLES BECKFELD.

Witnesses:
W. B. CORWIN,
DARWIN S. WOLCOTT.